Oct. 10 1967  F. PARRI  3,345,658
DEVICE FOR THE MANUFACTURE OF MOCCASINS
Filed Sept. 27, 1966  4 Sheets-Sheet 1
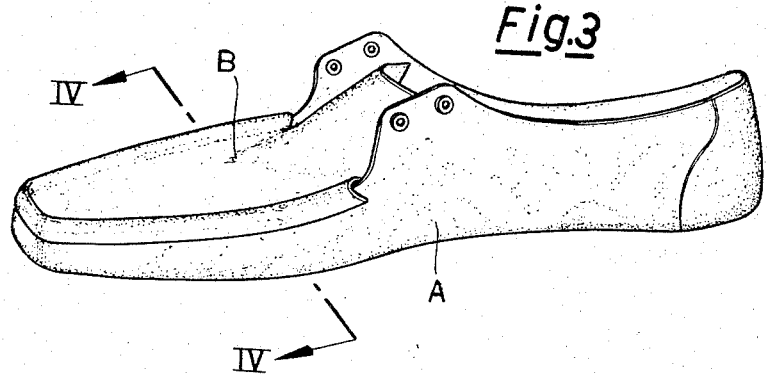
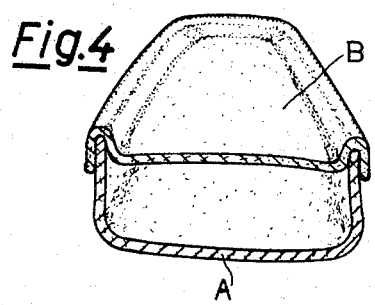
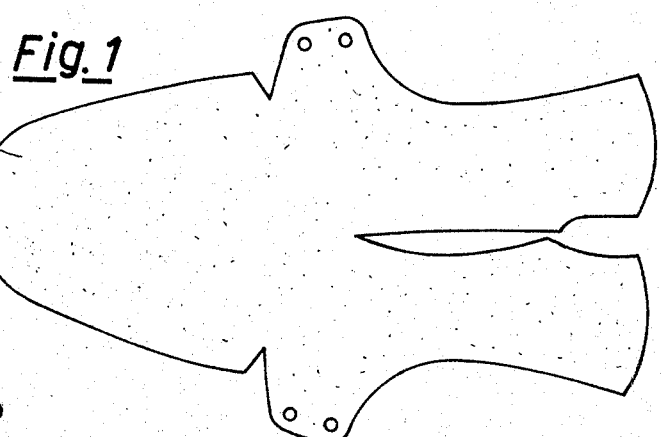
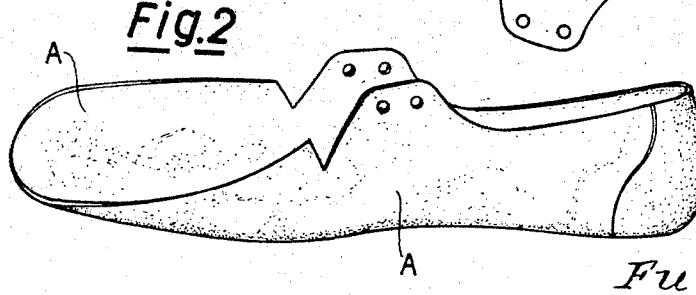
INVENTOR
*Fulvio Parri*
BY *Mason, Porter, Diller & Brown*
ATTORNEYS

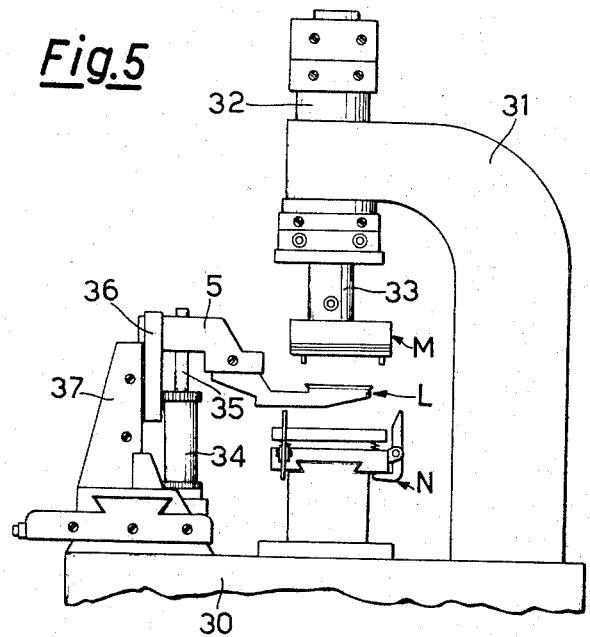
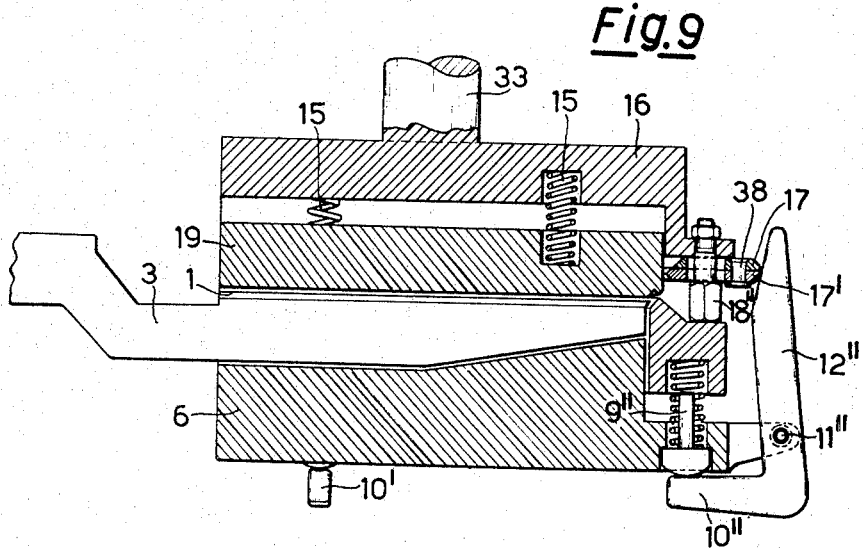

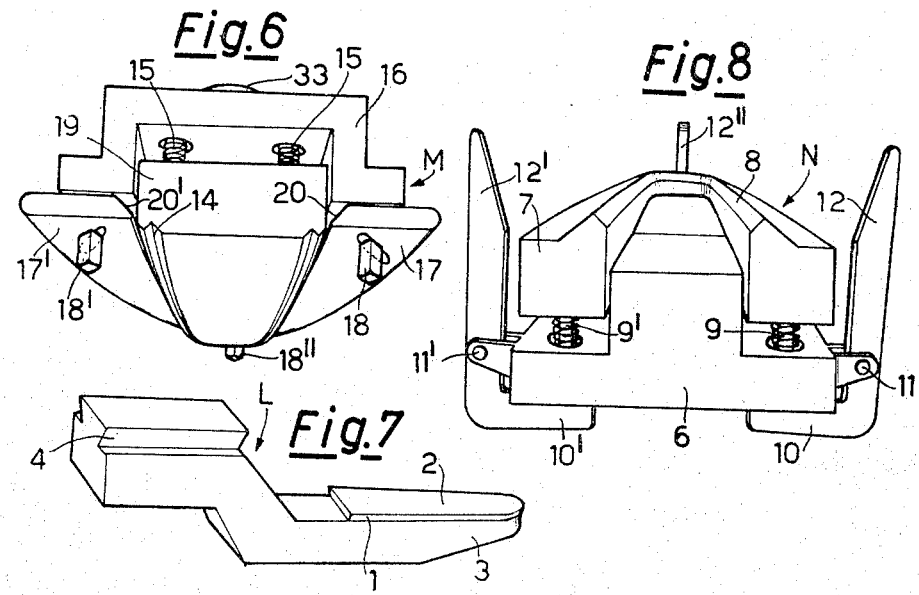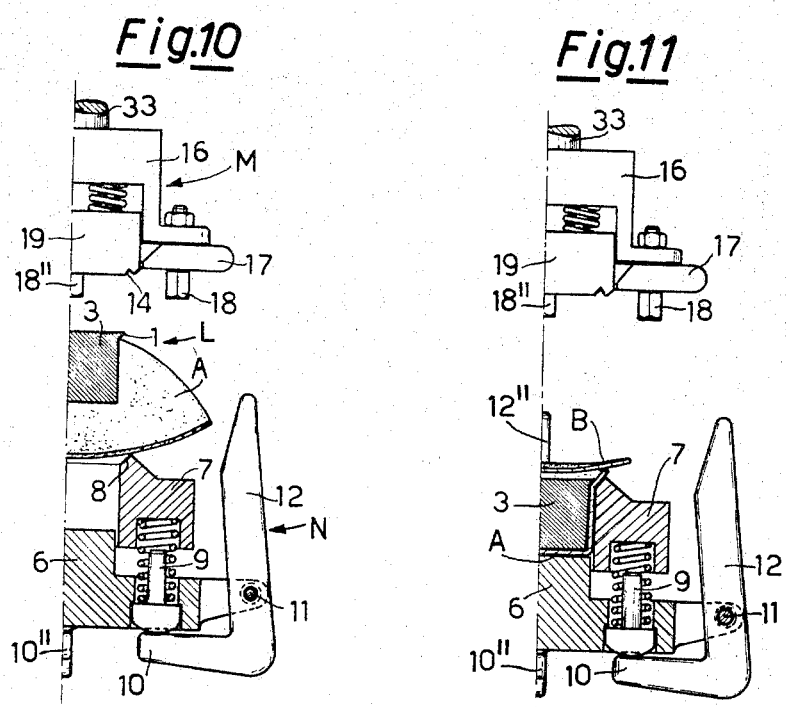

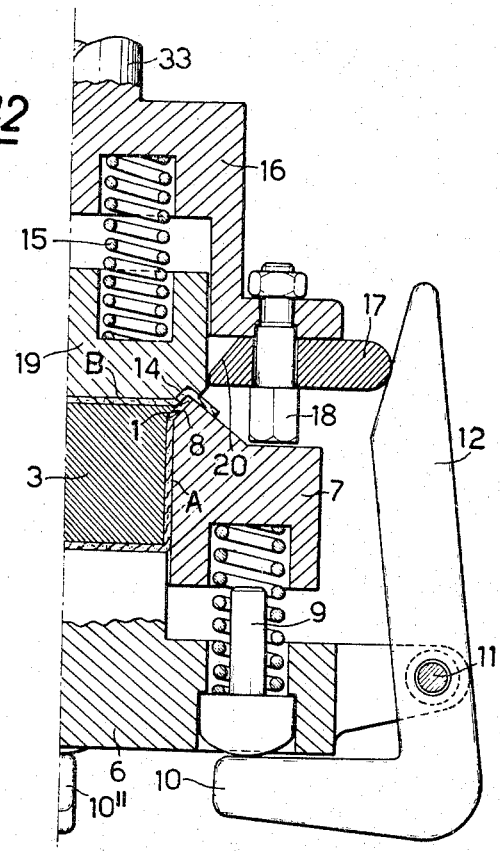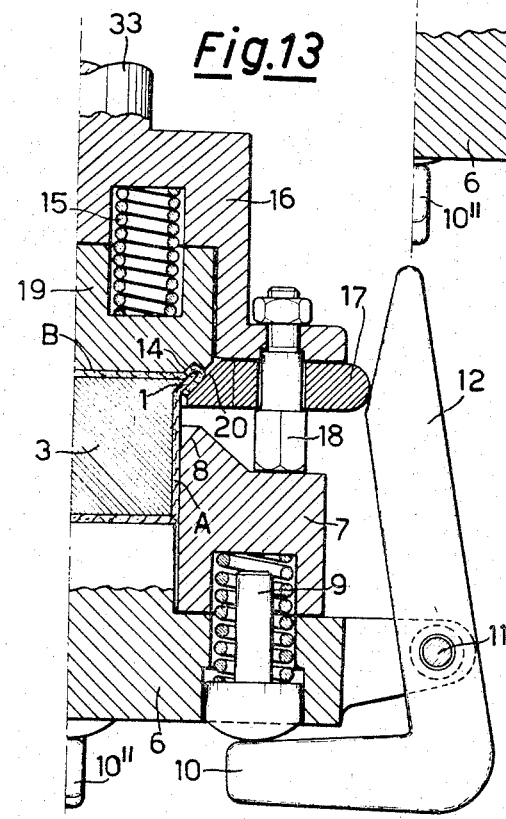

United States Patent Office 3,345,658
Patented Oct. 10, 1967

3,345,658
DEVICE FOR THE MANUFACTURE OF MOCCASINS
Fulvio Parri, Via dei Mille 14, Porto Sant'Elpidio, Italy
Filed Sept. 27, 1966, Ser. No. 582,439
Claims priority, application Italy, Sept. 30, 1965,
9,642/65
10 Claims. (Cl. 12—1)

ABSTRACT OF THE DISCLOSURE

This disclosure relates to apparatus for manufacturing moccasins and other types of footwear, comprising first, second and third parts, the second and third of which are vertically movable relative to the first part. The first part has an ancillary spring urged member projecting upwardly therefrom and it is especially configured to facilitate the formation of a seam on the upper portion of a moccasin-bottom blank. A moccasin bottom blank is disposed between the fixed first part and the second part, and the second part is vertically movable downwardly into a hollow of the ancillary member of the first part, with the bottom blank therebetween. A top blank is then disposed in overlying relation to the second part, and the third part is then moved vertically downwardly, until an ancillary member of the third part, also spring urged away from the third part, engages the upper seam forming portions of both the upper and lower shoe-forming members, the ancillary members cooperating to engage moccasin seam portions therebetween. Transversely movable jaws are provided, which are actuated by the third part, upon abutting engagement of the ancillary members with the shoe-forming portions therebetween, to transversely move the jaws to bend an upper shoe-forming portion into position whereby a double-seam is effected about the upper peripheral edge of the moccasin-forming blank.

This invention relates to an apparatus for the manufacture of moccasins, and, more particularly, to an apparatus by which the upper portion of a moccasin can be applied to the lower portion, or sole portion of a moccasin in quite rapid and convenient way.

The subject device comprises a first, a second and a third component part, two at least of which are movable relative to one another and relative to the other component part; a first component part comprising a first main member, a first ancillary member movable on said first main member and yieldable means for thrusting said first ancillary member towards a projecting position with respect to said first main member, whereby said first ancillary member has a substantial U-shaped configuration in plan with the extreme edge sloping outwardly and with an inner surface whose profile has substantially the shape, in plan, of the front portion of the moccasin to be manufactured; a second component part consisting of a rigid body having substantially the shape of the front portion of the moccasin to be manufactured and having a peripheral edge which projects with a surface facing towards the first component part shaped in a complementary fashion with respect to said inclined extreme edge of said first ancillary member; a third component part comprising a second main member supporting a second ancillary member movable with respect thereto, and jaws, positioned so as to take a substantial U-shape, movable transversally with respect to the direction of movement of the second ancillary body on the second main member, and further comprising yieldable means thrusting said second ancillary member away of said second main member; means being provided for selectively moving said two movable component parts towards or away of the other component part, and means for displacing the jaws, concentrically causing them to approach. The means for selectively moving said two movable component parts act so that the second component part is first brought into contact with the inclined extreme edge of the first ancillary member to form an assembly, and then the third component part and the assembly formed by the first and the second component parts are moved toward one another so as to bring the second ancillary member into contact with the second component part, and the second main member into contact with the first ancillary member and so that said second ancillary member and said first ancillary member may take a retracted position on the second main member and on the first main member, respectively, overcoming the bias of the respective yieldable members, said jaws being at this stage concentrically approached to one another.

In order that the structure and operation of the device, along with the advantages stemming from the use thereof may be more clearly understood, an embodiment will now be described by way of example only and without any limitation, reference being had to the accompanying drawings, wherein:

FIGURE 1 is a cut blank to be used in the manufacture of a moccasin.
FIGURE 2 is the blank shown FIG. 1, as folded in the conventional way.
FIGURE 3 shows a moccasin obtained with the blank of FIGS. 1 and 2.
FIGURE 4 is a cross-sectional view, taken along line IV—IV, of the moccasin shown FIG. 3.
FIGURE 5 is a diagrammatical side view of the moccasin-manufacturing machine.
FIGURES 6, 7 and 8 are perspective views of three component parts of the device of FIG. 5.
FIGURE 9 is illustrative of a diagrammatical longitudinal cross-sectional view of the three component parts of FIGS. 6, 7 and 8 in their approached positions, and
FIGURES 10 to 13 inclusive show diagrammatically and in cross-sectional view the three component parts of FIGS. 6, 7, 8 in the mutual positions they take during the operation of the device.

The device shown in FIGS. from 5 to 13 inclusive is used in the mechanical manufacture of moccasins of the kind depicted in FIG. 3. More accurately, once the blank A has been cut (FIG. 1) and folded (FIG. 2) in any conventional way, the device enables the upper portion B of the moccasin to be applied, in quite rapid and economical a way, and very accurately, too, overlying end portion of the front portion of the blank A. Before applying it to the blank A, the welt of the upper portion B of the moccasin is spread with a bonding agent, which ensures the subsequent adhesion of the upper portion B to the blank A; the mechanical action brought about by the device causes the upper portion B to take the position shown FIG. 4. Should it be desirable to strengthen the bond between the upper portion B of the moccasin and the blank A thereof, the moccasin can be stitched along the welt provided thereon in correspondence with the area whereat the upper portion B and the blank A are bonded together.

The apparatus shown FIG. 5 comprises a bedplate 30 to which an arm 31 is affixed, the latter carrying a ram 32 within which a piston (not shown) can slide, affixed to a stem 33 jutting from the bottom portion of said ram. Said ram can be fed, in a conventional way which has been omitted for the sake of simplicity, with pressurized oil, above or below said piston, enabling thus the latter to be displaced together with the stem 33, either upwardly or downwardly, so as to come close to, or away of, the bedplate 30. To the bedplate is affixed a ram 34, akin to the ram 32 but independent thereof, within which a piston, solidly carrying a stem 35, can slide either upwardly or downwardly. Solidly affixed to the stem 35 is a bracket 5, carrying, as a single entity, a slide 36 equipped with a dovetailed portion which is slidably guided within a guideway formed in a body 37 integral with the baseplate 30.

The bedplate 30 integrally carries a first component part N which is shown in closeup view in FIG. 8. A second component part L, shown FIG. 7, is carried by the bracket 5. A third component part M, shown in perspective view from beneath in FIG. 6, is solid with the stem 33. While the first component part N is fixed, the second and third component parts L and M can be displaced with respect to one another and also with respect to the component part N by feeding with pressurized oil the upper or the lower faces of the pistons of the rams 34 and 32.

The first component part N (FIG. 8) comprises a first main member 6, which is affixed to the bedplate 30, a first ancillary member 7, movable on the member 6, and three springs whose lowermost coils abut the enlarged heads of three dowels 9, 9' and 9" (see also the cross-sectional views shown FIGS. 9–13), said springs upwardly biasing the first ancillary member 7 thus causing it to protrude with respect to the first main member 6 (FIGS. 8–12). As seen in the drawings, the member 7 has a substantially U-shaped configuration in plan and has an extreme edge 8 sloping outwardly through an angle of about 45° with respect to a horizontal plane; the inner surface of the member 7 has vertical walls whose profile is substantially the same as the front portion of the moccasin of FIG. 3, as viewed from top. The member 7 is guided in its movement with respect to the member 6 by a protrusion of the member 6, having smooth vertical walls, as clearly shown in the drawings. To the member 6 are solidly affixed three couples of lugs which sustain, each, the pins 11, 11', 11", respectively, these latter supporting, in turn, in an idly rotary fashion, three bell-crank levers, each of which has two arms, 10 and 12, 10' and 12', and 10" and 12", respectively. Upon the ends of the arms 10, 10' and 10", the enlarged heads of the three dowels 9, 9' and 9", respectively, are allowed to rest.

The second component part L (FIG. 7) is formed by a rigid body 3 having substantially the shape of the front portion of the moccasin to be manufactured, which can be housed in the headroom confined by the inner surface of the first ancillary member 7 and the upper face of the vertical-walled projection of the first main member 6 (FIGS. 9 to 12). The uppermost portion 2 of the rigid body 3 is extended through a peripheral projecting edge 1, whose shape is complementary with the extreme edge 8 of the ancillary member 7, the lower surface of the edge 1 having also a 45° slope with respect to a horizontal plane. It should be noticed, at last, that the rigid body 3 has a dovetail connection 4 permitting the assembly and adjustment of the position of the second component part on the bracket 5.

The third component part M (FIG. 6) comprises a second main member 16 solid with the stem 33 and carrying a second ancillary member 19 movable with respect thereto; more accurately, the body 19 carries, solid therewith, rods extending upwardly and traversing perforations formed through the body 16 and project thereover. In the environment in which they protrude from the bores of the body 16, said rods have an enlarged head portion preventing them from being pulled out of their respective bores; said rods and said bores have not been shown so as to simplify the figures of the accompanying drawings. In the second main member 16, as well as in the second ancillary member 19, three cavities, having circular cross-sections, have been formed, to house three springs 15 which bias the second ancillary member 19 away of the second main member (FIGS. 6 and from 9 to 12). From the bottom of the second main member 16 project three pins 18, 18', 18", which carry two jaws 17, 17'. These have an inner surface 20, 20', sloping about 45°, and arranged so as to take substantially the shape of a U.

At the pins 18, 18', 18", the two jaws have arcuate slots within which said pins are housed: said slots allow the displacements of the jaws on the pins. More particularly, it can be noticed that, at the pins 18 and 18', the arcuate slots are obliquely set with respect to the longitudinal axis of the component part M (FIGURE 6), whereas, in correspondence with the pin 18" (FIGURE 9), said arcuate slots have their longitudinal axes lying on the longitudinal centerline plane of the bodies 16 and 19 and are superposedly arranged with respect to one another. In correspondence with said longitudinal plane of symmetry of the bodies 16 and 19, the two jaws have a slimmed down thickness and are superposedly positioned, being connected in a freely rotatable manner by a pin 38 (FIG. 9). As viewed in the drawings, the second ancillary member 19 has, along its lowermost edge, an inverted-V groove 14, whose function will be explained hereinafter. The operation of the device is as follows: starting from the initial positions in which the component parts L, M, N are all spaced apart from each other (FIGURE 5), the blank A, which has previously been shaped and welted, is placed on the first ancillary member 7 (FIG. 10), and then, by acting upon the ram 34, the second component part L is lowered so as to thrust the blank A into the headroom confined by the inner surface of the first ancillary member 7 and by the surface of the first main member 6 (FIG. 11). The lowermost sloping surface of the edge 1 of the body 3 squeezes the welt of the blank A outwardly, locking it against the edge 8 of the body 7, said edge partially jutting out of the edge 1 (FIG. 1), whose sloping surface has a width less than that of the sloping surface of the edge 8, as seen on the drawings.

The upper portion B of the moccasin is then positioned over the rigid body 3 (FIG. 11), upon spreading with cement the lower face of the upper portion B of the moccasin along a stripe which extends all along the welt of said upper portion B.

The third component part M is then lowered onto the assembly formed by the first and the second component parts. During said lowering step, the second ancillary member 19 contacts the upper portion B of the moccasin to press it against the rigid body 3 (FIG. 12) and the inverted V-shaped groove 14 of the body 19 creases the edge of the upper portion B of the moccasin pressing it towards the edge 8 of the member 7 and sticking it against the inner face of the welt of the blank A which jut out of the edge 1 of the body 3. As the depressional motion of the stem 33 of ram 32 is continued, while the body 19 stays at standstill in its already attained position, the second main member 16 is lowered thus causing, via the pins 18, 18', 18", the depression of the first ancillary member 7 (FIG. 13). By so doing, the springs 15 are compressed and, therewith, also the springs wrapping the three pins 9, 9', 9", the latter being pushed down. The enlarged heads of the pins 9, 9', 9" press against the arms 10, 10', 10" of the three bell-crank levers, causing the latter to be rotated about their respective pins 11, 11', 11". The arms 12, 12', 12" of the bell-crank levers thus press against the jaws 17, 17', showing them (this being permitted by the arcuate slots formed therein) so as to approach one another concentrically (FIG. 13) and to fold the extreme edge of the moccasin's upper portion B, by pressing it and sticking it against the outer face of the edge of the blank A as left free from the previously lowered edge of the body 7. At this stage the manufacture of the front portion of the moccasin is completed, and the moccasin, as removed from the machine, takes the configuration depicted in FIGURE 3.

FIGURES 12 and 13 have been drawn on an enlarged scale as compared with FIGS. 10 and 11 so as to permit a clearer showing of the component parts, L, M, N, of the machine under the conditions in which they are close to each other.

The foregoing has shown how easy and rapid an operation is to manufacture a moccasin with the device shown in the drawings.

Be it understood that said machine can undergo a number of changes, still within the scope of this invention. For example, the second component part L can be in fixed position, with the component parts M and N kept movable, or, as an alternative, all three component parts L, M, N can be made movable.

What I claim is:

1. An apparatus for the manufacture of moccasin shoes, comprising first, second and third component parts, two at least of which are movable relative to one another and relative to the other component part, said first component part comprising a first main member, a first ancillary member movable on said first main member, and yieldable means for thrusting said first ancillary member towards a projecting position with respect to said first main member, said first ancillary member has a substantially U-shaped configuration in plan with the extreme edge sloping outwardly and with an inner surface whose profile has substantially the shape, in plan, of the front portion of the moccasin to be manufactured, said second component part consisting of a rigid body having substantially the shape of the front portion of the moccasin to be manufactured and having a peripheral edge which projects with a surface facing towards the first component part shaped in a complementary fashion with respect to said inclined extreme edge of said first ancillary member, said third component part comprising a second main member supporting a second ancillary member with respect thereto, and jaws, positioned so as to take a substantial U-shape, movable transversally with respect to the direction of movement of the second ancillary member on the second main member, and further comprising yieldable means thrusting said second ancillary member away of said main member, means being provided for selectively moving said two movable component parts toward or away of the other component part, and means for displacing the jaws, concentrically causing them to approach, said means for selectively moving said two movable component parts acting so that the second component part is first brought into contact with the inclined extreme edge of said first ancillary member to form an assembly, and then the third component part and the assembly formed by the first and second component parts are moved towards one another so as to bring the second ancillary member into contact with the second component part, and the second main member into contact with the first ancillary member and so that said second ancillary member and said first ancillary member may take a retracted position on the second main member and on the first main member, respectively, overcoming the bias of the respective yieldable members, said jaws being at this stage concentrically approached to one another.

2. An apparatus according to claim 1, wherein said jaws are formed by two parts having arcuate slots in which pins are inserted which project out of said second main member, said pins sustaining said jaws, and wherein said arcuate slots have their longitudinal axes arranged so as to allow to the jaws a concentrical movement for approaching them or to urge them away of one another.

3. An apparatus according to claim 2, wherein said yieldable means thrusting said first ancillary member consist of springs whose either end abuts said first ancillary member, the other end abutting an enlarged portion of pins freely housed in bores formed through said first main member, said means for displacing said jaws comprising bell-crank levers fulcrumed to said first main member, an arm of each of said bell-crank levers abutting one of said pins, the other arm of each bell-crank lever abutting at least one of said jaws externally thereof.

4. An apparatus according to claim 1, wherein said peripheral edge projecting out of said second component part has an extension less than the width of the outwardly inclined extreme edge of said first ancillary member.

5. An apparatus according to claim 1, wherein said second ancillary member has an inverted V-shaped groove whose shape is substantially complementary with that of the extreme sloping edge of said first ancillary member.

6. An apparatus according to claim 1, wherein said yieldable means thrusting said second ancillary member away of said second main member consist of springs inserted between said members.

7. An apparatus according to claim 1, wherein said first, second and third component parts are positioned on the same vertical line, the first component part being placed beneath said second component part, the third component part being located beneath said second component part.

8. An apparatus according to claim 7, wherein said first component part is in fixed position, the second and the third component parts being movable, said means for selectively moving said two movable component parts comprising two distinct hydraulic rams to the stems of whose pistons the second component part and, respectively, the third component part are affixed.

9. An apparatus according to claim 3, wherein said second ancillary member has an inverted V-shaped groove whose shape is substantially complementary with that of the extreme sloping edge of said first ancillary member.

10. An apparatus according to claim 4, wherein said second ancillary member has an inverted V-shaped groove whose shape is substantially complementary with that of the extreme sloping edge of said first ancillary member.

References Cited

UNITED STATES PATENTS

| | | | |
|---|---|---|---|
| 1,388,120 | 8/1921 | Pope | 12—1 X |
| 1,725,314 | 8/1929 | Strauss | 12—1 |
| 2,193,796 | 3/1940 | Ashworth | 12—1 |
| 2,198,866 | 4/1940 | Engel | 12—1 |

PATRICK D. LAWSON, *Primary Examiner.*